US009006552B2

(12) United States Patent
Fukuda

(10) Patent No.: US 9,006,552 B2
(45) Date of Patent: Apr. 14, 2015

(54) EFFECT APPARATUS FOR ELECTRONIC STRINGED MUSICAL INSTRUMENTS

(71) Applicant: Roland Corporation, Shizuoka-ken (JP)

(72) Inventor: Yasuhiro Fukuda, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 227 days.

(21) Appl. No.: 13/651,154

(22) Filed: Oct. 12, 2012

(65) Prior Publication Data

US 2013/0104726 A1 May 2, 2013

(30) Foreign Application Priority Data

Oct. 28, 2011 (JP) ................................ 2011-238017

(51) Int. Cl.
*G01P 3/00* (2006.01)
*G10H 1/00* (2006.01)
*G10H 1/12* (2006.01)
*G10H 3/18* (2006.01)

(52) U.S. Cl.
CPC ............. *G10H 1/0091* (2013.01); *G10H 1/125* (2013.01); *G10H 3/186* (2013.01); *G10H 2210/066* (2013.01)

(58) Field of Classification Search
CPC ..... G10H 1/0091; G10H 3/186; G10H 1/125; G10H 2210/066
USPC ........................................................... 84/626
See application file for complete search history.

(56) References Cited

U.S. PATENT DOCUMENTS

| | | | |
|---|---|---|---|
| 1,893,895 | A | 1/1933 | Hammond, Jr. |
| 2,001,723 | A | 5/1935 | Hammond, Jr. |
| 3,535,972 | A | 10/1970 | Teranishi |
| 3,571,480 | A | 3/1971 | Tichenor et al. |
| 3,612,741 | A | 10/1971 | Marshall |
| 3,677,124 | A | 7/1972 | O'Brien |
| 3,742,113 | A | 6/1973 | Cohen |
| 4,075,921 | A | 2/1978 | Heet |
| D248,122 | S | 6/1978 | Heet |
| 4,236,433 | A | 12/1980 | Holland |
| 4,245,540 | A | 1/1981 | Groupp |

(Continued)

FOREIGN PATENT DOCUMENTS

| | | |
|---|---|---|
| JP | 03-243993 | 10/1991 |
| JP | 05-046175 | 2/1993 |

(Continued)

OTHER PUBLICATIONS

English Machine Translation of JP publication JP06-025898 publication date Apr. 8, 1994 by Roland Corporation.

(Continued)

*Primary Examiner* — Jianchun Qin
(74) *Attorney, Agent, or Firm* — David W. Victor; Konrad, Raynes, Davda & Victor LLP

(57) ABSTRACT

Provided are an effect device and method to receive an input tone signal based on vibrations of a stringed instrument. A pitch is determined. Parameters specifying filter characteristics are determined from the pitch. The determined parameters are set in at least one filter. The input tone signal is passed into the at least one filter set with the determined parameters to produce a filter output signal that is used to generate an output signal for feedback performance produced through a speaker.

26 Claims, 8 Drawing Sheets

(56) References Cited

U.S. PATENT DOCUMENTS

| | | | | |
|---|---|---|---|---|
| 4,248,120 | A | 2/1981 | Dickson | |
| 4,697,491 | A | 10/1987 | Maloney | |
| 4,852,444 | A | 8/1989 | Hoover et al. | |
| 4,858,508 | A | 8/1989 | Shibukawa | |
| 4,907,483 | A | 3/1990 | Rose et al. | |
| 4,941,388 | A | 7/1990 | Hoover et al. | |
| 4,982,644 | A | 1/1991 | Shibukawa | |
| 5,054,361 | A | 10/1991 | Usa | |
| 5,070,759 | A | 12/1991 | Hoover et al. | |
| 5,123,324 | A | 6/1992 | Rose et al. | |
| 5,200,569 | A | 4/1993 | Moore | |
| 5,233,123 | A | 8/1993 | Rose et al. | |
| 5,278,350 | A | 1/1994 | Okamoto et al. | |
| 5,288,940 | A | 2/1994 | Izumisawa | |
| 5,292,999 | A | 3/1994 | Tumura | |
| 5,378,850 | A | 1/1995 | Tumura | |
| 5,449,858 | A | 9/1995 | Menning et al. | |
| 5,523,526 | A | 6/1996 | Shattil | |
| 5,585,588 | A | 12/1996 | Tumura | |
| 5,691,496 | A * | 11/1997 | Suzuki et al. | 84/661 |
| 5,932,827 | A | 8/1999 | Osborne et al. | |
| 6,034,316 | A | 3/2000 | Hoover | |
| 6,348,791 | B2 | 2/2002 | Shattil | |
| 6,762,357 | B2 * | 7/2004 | Washiyama et al. | 84/603 |
| 7,453,040 | B2 | 11/2008 | Gillette | |
| 7,678,988 | B2 | 3/2010 | Sato et al. | |
| 7,786,374 | B2 | 8/2010 | Valli et al. | |
| 8,067,683 | B2 | 11/2011 | Meeks et al. | |
| 8,735,710 | B2 | 5/2014 | Yamabata | |
| 2002/0069749 | A1 | 6/2002 | Hoover et al. | |
| 2005/0081703 | A1 | 4/2005 | Hoover | |
| 2009/0320671 | A1 | 12/2009 | Meeks et al. | |
| 2013/0205978 | A1 | 8/2013 | Yamabata | |
| 2014/0198930 | A1 * | 7/2014 | Thuillier | 381/98 |

FOREIGN PATENT DOCUMENTS

| | | |
|---|---|---|
| JP | 06-025896 | 4/1994 |
| JP | 06-025898 | 4/1994 |
| JP | 09-305168 | 11/1997 |
| JP | 201215885 | 1/2012 |

OTHER PUBLICATIONS

English machine translation of JP06-025896 published Apr. 8, 1994.

English machine translation of JP05-046175 published Feb. 26, 1993.

English machine translation of JP09-305168 published Nov. 28, 1997.

English machine translation of JP2012-015885 published Jan. 19, 2012.

English machine translation of JP06-25898, Apr. 8, 1994 by Roland Corporation.

Office Action dated Oct. 7, 2013, pp. 14, for U.S. Appl. No. 13/745,659, filed May 27, 2014 (97.27).

Response dated Dec. 20, 2013, pp. 7, to Office Action dated Oct. 7, 2013, pp. 14, for U.S. Appl. No. 13/745,659, filed May 27, 2014 (97.27).

Notice of Allowance dated Feb. 20, 2014 , pp. 7, for U.S. Appl. No. 13/745,659, filed May 27, 2014 (97.27).

* cited by examiner

EFFECT APPARATUS FOR ELECTRONIC STRINGED MUSICAL INSTRUMENTS

CROSS-REFERENCE TO RELATED FOREIGN APPLICATION

This application is a non-provisional application that claims priority benefits under Title 35, United States Code, Section 119(a)-(d) from Japanese Patent Application entitled "EFFECT APPARATUS FOR ELECTRONIC STRINGED MUSICAL INSTRUMENTS" by Yasuhiro FUKUDA, having Japanese Patent Application Serial No. 2011-238017, filed on Oct. 28, 2011, which Japanese Patent Application is incorporated herein by reference in its entirety.

BACKGROUND OF THE INVENTION

1. Field of the Invention

The present invention relates to effect devices and, in particular to effect devices by which feedback performance can be carried out easily.

2. Description of the Related Art

A performance technique for the electric guitar, which is one of the stringed instruments, involves the use of feedback. In the feedback performance, the player plucks the strings of the electric guitar and moves the electric guitar, while the strings are still vibrating, close to a loudspeaker of a guitar amplifier that is amplifying musical tones based on the plucking of the strings and emanating sounds. By performing this operation, a feedback loop is formed from the strings of the electric guitar, the loudspeaker and the acoustic space between the loudspeaker and the electric guitar. In this feedback loop, the strings being plucked are further vibrated by resonance caused by the musical tones (musical tones based on plucking of the strings) emanated from the loudspeaker, whereby the feedback performance is realized.

However, the feedback performance is a performance technique that requires subtle control in, for example, the manner in which the strings are plucked, the distance between the loudspeaker and the strings, the direction and timing in which the strings are moved closer to the loudspeaker, the sound volume (output level) of musical tone emanated from the loudspeaker and the like. Thus, feedback performance provides a high degree of difficulty for musicians, which means that performers often fail in successfully executing feedback performance.

Japanese Utility Model Patent Application HEI 6-25898 describes an effect device that detects the pitch of musical tone pronounced by plucking the strings, and sets a band-pass filter to pass only frequency components in a predetermined passband width in which the frequency corresponding to the detected pitch is assumed to be a center frequency. This effect device allows the musical tone with a desired pitch to be produced by plucking the strings (that is, in the electric guitar, the musical tone with a pitch that is specified by the performer by pressing the strings against the fret, and may be referred to as the "fundamental (fundamental tone)" or the "keynote") such that the frequency component of the musical tone is emphasized in the output and, as a result, the vibration of the strings can be continued with the frequency of the fundamental.

SUMMARY

Provided is an effect device comprising: an input device to which a tone signal based on vibration of strings of a stringed instrument is input; a filter device that passes the tone signal input from the input device; a pitch detection device that detects a pitch of the tone signal input from the filter device and/or a pitch of the tone signal to be input to the filter device; a setting device that sets a parameter of the filter device corresponding to the pitch detected by the pitch detection device; an output device that outputs the tone signal output from the filter device outside; a level detection device that detects a level of the tone signal output from the filter device and/or a level of the tone signal to be input in the filter device; and a level control device that controls so that the level of the tone signal output outside from the output device has a level corresponding to the level detected by the level detection device.

In further embodiments, an effect device and method are provided to receive an input tone signal based on vibrations of a stringed instrument. A pitch is determined. Parameters specifying filter characteristics are determined from the pitch. The determined parameters are set in at least one filter. The input tone signal is passed into the at least one filter set with the determined parameters to produce a filter output signal that is used to generate an output signal for feedback performance produced through a speaker.

DETAILED DESCRIPTION

Figure 1:
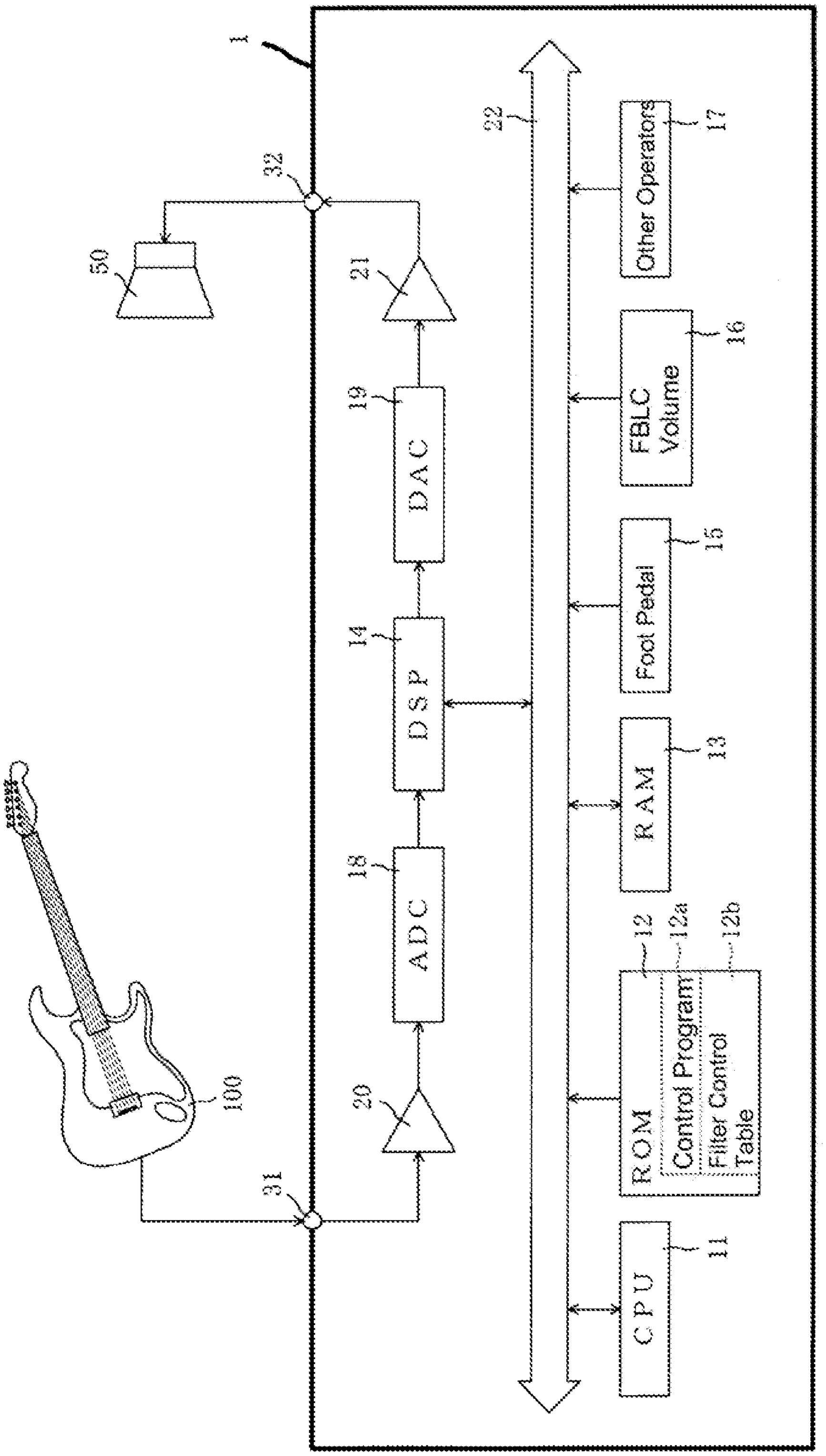
FIG. 1 is a block diagram showing an electrical configuration of an effect device.

In prior art feedback performance, in order to maintain the vibration of the strings that are initiated by plucking, the sound volume (level) of the musical tone emanated from the loudspeaker needs to be very loud. However, with current effect devices, the level of the feedback sound is naturally attenuated such that the vibration of the strings of the stringed instrument cannot be stably maintained at higher volumes, else intense feedback (howling) that is stronger and different from what the performer intended may occur.

Moreover, even if only the fundamental (the keynote) is fed back, it does not finally shift to harmonics. Therefore, in the current art, even if the performer plays the feedback performance, there are problems in that natural feedback performance cannot be created depending on the bandwidth, shifting to harmonics upon feedback is prevented, and the like. Normally, in the feedback performance, it is desirable for the feedback sound to start from the pitch of the musical tone of the plucked string, and then to change to a prescribed harmonic. However, with current effect devices, satisfactory shift to harmonics is not achieved. Thus, it is difficult for current effect devices to create the feedback performance intended by the performer.

The described embodiments provide improved effect devices by which the feedback performance can be easily executed.

In a described embodiment, an effect device is provided with a setting device that sets parameters of a filter device that passes a tone signal input from an input device according to the pitch detected by a pitch detecting device. An output device outputs a tone signal with a frequency characteristic according to the pitch detected by the pitch detection device. By setting the parameters of the filter device such that the tone signal output from the filter device has frequency characteristics suitable for feedback performance, the tone signal of frequency characteristics suitable for feedback performance can be output outside. As a result, because the vibration of the strings of the stringed instrument can be maintained by the tone signal output outside, highly difficult feedback performance can be readily realized.

In a further embodiment, the level of the tone signal output from the filter device, and/or the level of the tone signal input in the filter device are detected by a level detection device. Then, a level control device controls such that the level of the tone signal output from the output device outside may comprise a level corresponding to the level detected by the level detection device. Therefore, even if the level of the tone signal that has passed the filter device or the level of the tone signal before passing the filter device is small, the level may be controlled by the level control device to become higher, such that attenuation of the level of the tone signal to be output from the output device (i.e., the tone signal filtered by the filter device) is suppressed. In this way, the tone signal to be outputted from the output device is sustained, such that the vibration of the strings of the stringed instrument can be stably maintained to provide improved feedback performance.

In a further embodiment, a setting device sets parameters at the filter device according to a pitch frequency band to which the pitch detected by the pitch detection device belongs. For each frequency band to which the detected pitch (in other words, the pitch of the tone signal) belongs, parameters suitable for the frequency band can be set. Therefore, for each frequency band, parameters of the filter device can be set so that the signal is output with frequency characteristics suitable for the feedback performance, by which the feedback sound can be shifted easily from the fundamental (the keynote) to harmonics, and the like. Accordingly, for each frequency band, suitable feedback performance can be realized with ease. The parameters set by the setting device may include, for example, the center frequency, the Q value (passband width), and the gain of the filter device. Further, two or more filter devices may be included.

In a further embodiment, according to a pitch frequency band to which the pitch detected by the pitch detection device belongs, different parameters may be set by the setting device according to the frequency band of each of a plurality of the filter devices. In other words, by using the plurality of the filter devices each being set for a frequency band to which the detected pitch (i.e., the pitch of the tone signal) belongs, the tone signal input from the input device can be filtered. For each frequency band, a tone signal with frequency characteristics suitable for feedback performance can be output from the output device to realize suitable feedback performance.

In a further embodiment, when the detected level detected by the level detection device is below a predetermined level, the level of the tone signal output from the filter device may be raised by the level control device. On the other hand, when the detected level is at the predetermined level or greater, the level of the tone signal output from the filter device may be maintained by the level control device. Accordingly, the tone signal that has been filtered by the filter device and output from the output device can be sustained, to allow the performer to easily perform the feedback performance.

In a further embodiment where the parameters set by the setting device include the center frequency, the Q value and the gain of a band pass filter that is the filter device, the parameters may be suitably combined such that a tone signal with frequency characteristics suitable for feedback performance can be output from the filter device.

In a further embodiment, when the pitch detected by the pitch detection device belongs to the frequency band of a predetermined bass range, the center frequency of one filter device is set to the frequency of a harmonic based on the pitch detected by the pitch detecting device and the Q value is set to a size that selectively transmits the musical tone based on the detected pitch and the harmonic with a frequency as being the center frequency of the filter device. Therefore, the filter device can pass multiple tone signals including at least the musical tone based on the detected pitch (in other words, the fundamental) and the harmonic with a frequency being the center frequency of the filter device. In the case of the bass range where the power of the fundamental is strong, a natural feedback sound can be obtained by passing the fundamental and the harmonic together in a manner described above. Moreover, the harmonic to which the musical tone in the bass range shifts changes according to the acoustic space that composes the feedback loop. Looseness in the harmonic shift can be retained by setting the Q value that defines a wide passband width that contains the fundamental and the harmonic at the filter device. As a result, the performer using the feedback performance has an enhanced performance experience.

In a further embodiment, when the pitch detected by the pitch detection device belongs to the frequency band of a predetermined mid-range, the center frequency of one of the two filter devices is set to the frequency of a harmonic based on the pitch detected and the gain is set to a predetermined value. Further, the center frequency of another one of the two filter devices (the other filter device) is set to the detected pitch (in other words, the frequency of the fundamental) and the gain is set to a value smaller than the predetermined value. Therefore, a level difference can be provided between the musical tone based on the detected pitch (i.e., the fundamental) and the harmonic that passes the filter device, and the harmonic transition in the feedback performance can be induced by this level difference. Therefore, when the tone signal of a predetermined mid-range is input, the musical tone that is fed back by a feedback loop can eventually be shifted to a harmonic, such that natural feedback performance can be performed.

In a further embodiment, a relative difference between the gain of the one filter device and the gain of the other filter device can be changed. Because the ease of the harmonic shift (the time of shifting to the harmonic) depends on the above-mentioned level difference, the ease of the harmonic shift can be controlled arbitrarily as desired because the level difference can be arbitrarily controlled. This provides the performer greater control over the feedback performance.

In a further embodiment, when the pitch detected by the pitch detection device belongs to the frequency band of a predetermined treble range, the setting device sets the center frequency of the one filter device to the pitch detected (i.e., the frequency of the fundamental) and the Q value to a size that selectively passes the musical tone based on the detected pitch (i.e. the fundamental). Accordingly, the feedback performance can be performed while preventing the occurrence of unpleasant ultrahigh-pitched sound.

Embodiments of the present invention will be described with reference to the accompanying drawings. FIG. 1 is a block diagram showing an electrical configuration of an effect device in accordance with an embodiment of the invention. A feedback loop is formed by strings of an electric guitar 100, a speaker 50 of a guitar amplifier and an acoustic space formed between the guitar 100 and the speaker 50. An effect device 1 sets filter characteristics (see FIG. 2) of built-in filter parts 73 and 74, and controls the level of signals after passing the filter parts 73 and 74 so that the performer can easily perform the feedback performance.

As shown in FIG. 1, the effect device 1 includes a central processing unit (CPU) 11, a read only memory (ROM) 12, a random access memory (RAM) 13, a digital signal processor (DSP) 14, a foot pedal 15, a feedback level control volume 16 (hereinafter referred to as a "FBLC volume"), and other operator 17. The components 11, 12, 13, 4, 15, 16, and 17 are connected via a bus line 22.

The effect device 1 also includes an analog to digital converter (ADC) 18, a digital to analog converter (DAC) 19, and amplifiers 20 and 21. The ADC 18 is connected to the DSP 14 and the amplifier 20. The DAC 19 is connected to the DSP 14 and the amplifier 21.

A signal input from an input terminal 31 is amplified by the amplifier 20, converted into a digital signal by the ADC 18, and input to the DSP 14 to be subjected to processing. The signal processed by the DSP 14 is converted to an analog signal by the DAC 19, and then amplified by the amplifier 21, and then output from an output terminal 32. By connecting the electric guitar 100 to the input terminal 31, and the guitar amplifier (the speaker 50) to the output terminal 32, a feedback loop can be formed from the strings of the electric guitar 100, the guitar amplifier (the speaker 50), and the acoustic space between them.

Figure 6:
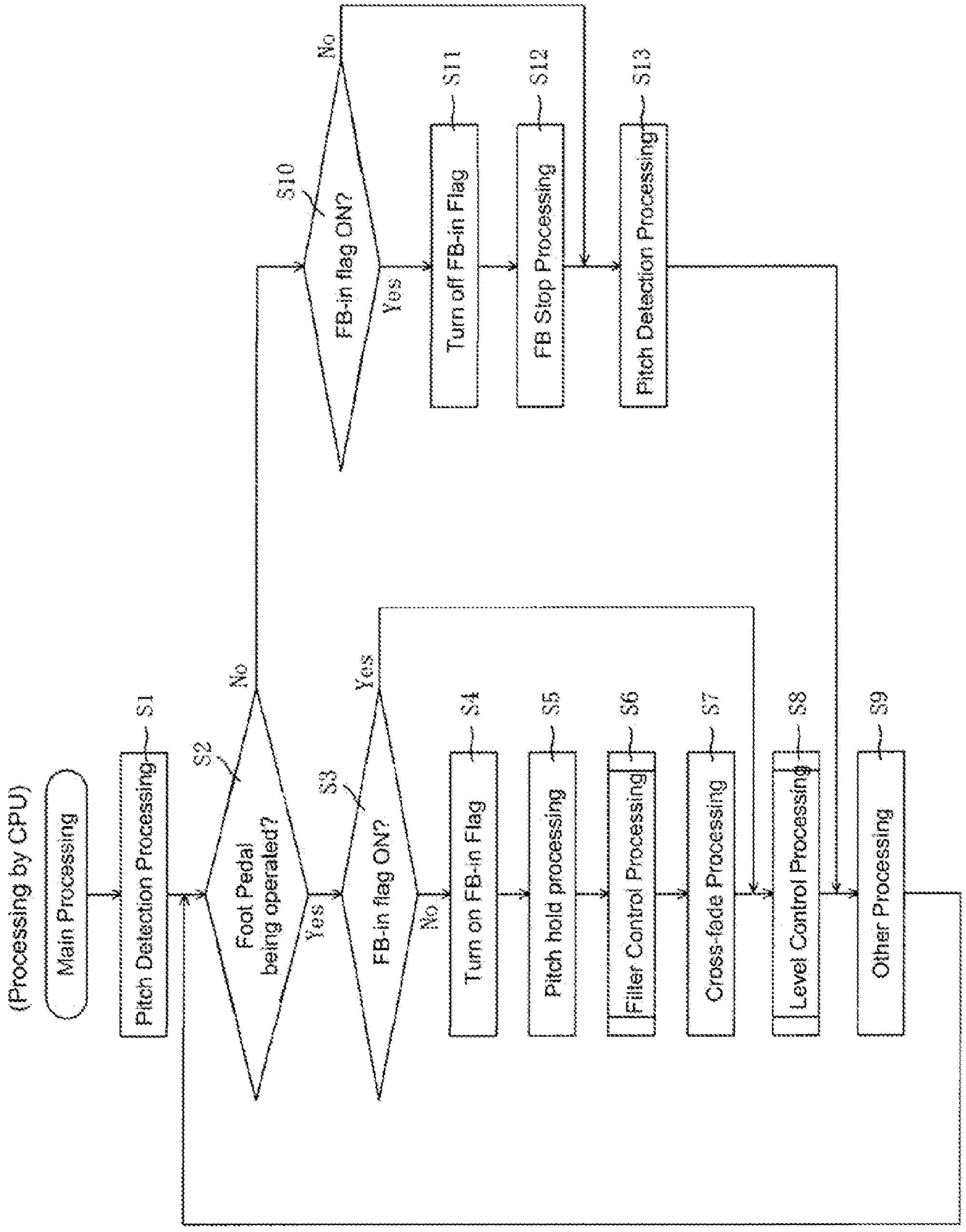
FIG. 6 is a flowchart showing a main processing executed by the CPU.
Figure 7A:
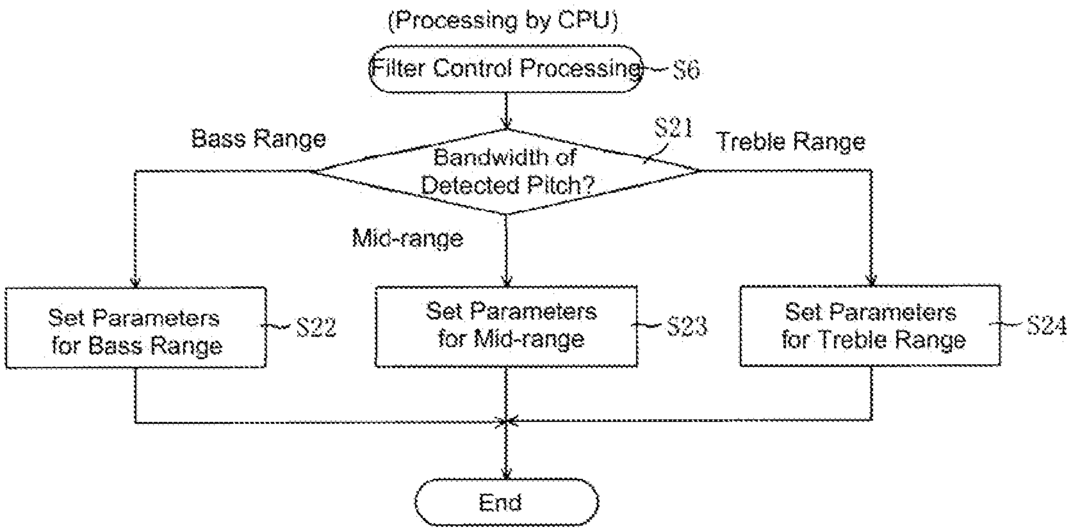
FIGS. 7*a* and 7*b* are flowcharts showing a filter control processing and a level control processing executed in the main processing in FIG. 6, respectively.
Figure 7B:
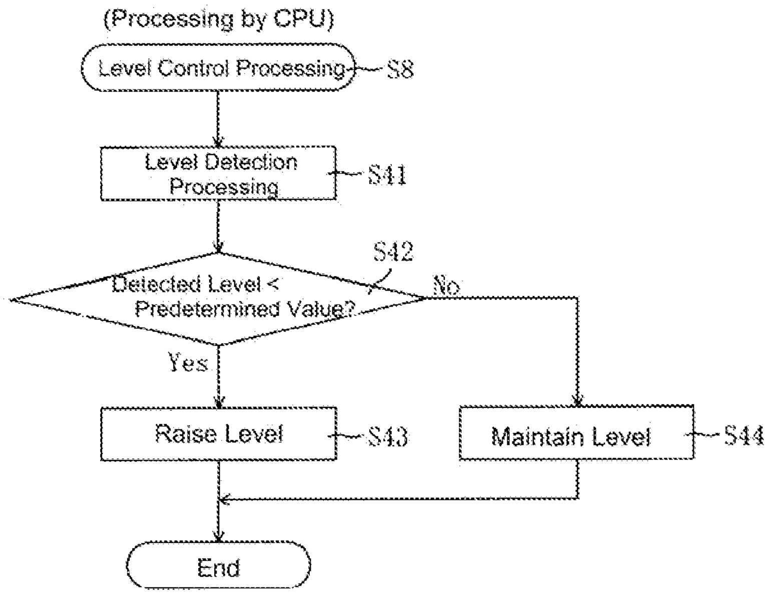

The CPU 11 is a central control unit that controls each part of the effect device 1 according to fixed value data and control programs stored in the RAM 13 and ROM 12. The ROM 12 is a non-rewritable memory, and stores a control program 12*a* for the CPU 11 and the DSP 14 to execute each processing, and fixed value data (not shown) referred to by the CPU 11 when the control program 12*a* is executed. The operations described below with respect to FIG. 6, FIG. 7*a* and FIG. 7*b* are executed by the CPU 11 in accordance with the program 12*a*.

Also, the ROM 12 stores a filter control table 12*b*. The filter control table 12*b* is a table that stores parameters to be set at the filter parts 73 and 74 (see FIG. 2). Table 1 below schematically shows the contents of the filter control table 12*b*.

TABLE 1

| Frequency Band | Filter part used | Center frequency | Q value (passband width) | Gain |
|---|---|---|---|---|
| Bass range | Filter Part 74 | Fx ℓ: Predetermined harmonic | Qx ℓ: Wide | Gx ℓ: High |
| Mid-range | Filter Part 73 | Ffm: Fundamental | Qfm: Narrow | Gfm: Low (variable) |
| | Filter Part 74 | Fxm : Predetermined harmonic | Qxm: Narrow | Gxm: High |
| Treble range | Filter Part 73 | Ffh: Fundamental | Qfh: Narrow | Gfh: High |

As shown in Table 1, the filter control table 12*b* stores, as parameters, for each frequency band (bass range, mid-range, treble range), the number of the filter part to be used, the center frequency, the Q value (passband width) of each of the band-pass filters (BPFs) 73*a* and 74*a*, and the gain to be supplied to each of the multipliers 73*b* and 74*b*. The effect device 1 of the present embodiment refers to the filter control table 12*b*, and sets parameters of the filter parts 73 and 74 according to the frequency band of the tone signal (input signal) input from the input terminal 31.

More specifically, when the input signal is a tone signal in the bass range (for example, in the bandwidth of less than 100 Hz), filter part 74 is used. Then the center frequency of the BPF 74*a* of the filter part 74 is set to Fx l that is the frequency of a predetermined harmonic for the fundamental (keynote). Note that a lowercase block letter "l (el)" shown in the present specification is shown by a cursive letter l (el) in Table 1 and the drawings.

As the "predetermined harmonic," for example, the second harmonic that is one octave above the fundamental, the fourth harmonic that is two octaves above the fundamental, and the eighth harmonic that is three overtones above the fundamental can be exemplified. It may be a non-octave harmonic, which may be the third harmonic or the like. The frequency of the fundamental is a pitch detected by the pitch detection device 71 (see FIG. 2). Therefore, the frequency Fx l of the predetermined harmonic is also a value determined based on the detected pitch.

Further, the Q value (passband width) of the BPF 74*a* is set to Qxl. Qxl is a fixed value indicative of a wide passband width including the frequency of the fundamental in this embodiment. In addition, the gain to be supplied to the multiplier 74*b* composing the filter part 74 is set to Gxl. Gxl is a fixed value that indicates a high gain.

When the input signal is a tone signal of the mid-range (e.g., 100 Hz-600 Hz), two filters 73 and 74 are used. The center frequency of BPF 73*a* of filter 73 is set to Ffm, which is the frequency of the fundamental. Ffm, which is the frequency of the fundamental, is a pitch detected by the pitch detection part 71.

The Q value of BPF 73*a* is set to Qfm. Qfm is a fixed value indicative of a narrower passband width than that of the Q value (Qxl) used in the bass range. The gain to be supplied to the multiplier 73*b* of the filter part 73 is set to Gfm. The value of Gfm is a variable value indicative of a comparatively low gain, and can be changed arbitrarily in proportion to the amount of operation of the FBLC volume 16. However, even if the value of Gfm is the maximum value that can be taken according to the amount of operation of the FBLC volume 16, it is smaller than the value (Gxm) of the gain supplied to the multiplier 74*b* of the filter part 74.

Moreover, the center frequency of BPF 74*a* of the filter 74 is set to Fxm, which is the frequency of a predetermined harmonic for the fundamental. Fxm, which is the frequency of the predetermined harmonic, is a value that is decided based on the detected pitch. The "predetermined harmonic" used in the mid-range can be any one of various harmonics (for instance, the second harmonic, etc.), similarly to the case of the bass range described above.

The Q value of BPF 74*a* is set to Qxm. Qxm is a fixed value indicative of a narrower passband width than that of the Q value used in the bass band (Qxl). The gain to be supplied to the multiplier 74 *b* is set to Gxm. Gxm is a fixed value indicative of a high gain.

If the input signal is a tone signal in a treble range (for example, a bandwidth of more than 600 Hz), one filter 73 is used. Then, the center frequency of BPF 73*a* of the filter part

73 is set to Ffh, which is the frequency of the fundamental. Ffh, which is the frequency of the fundamental, is the pitch detected by the pitch detection part 71.

The Q value of BPF 73*a* is set to Qfh. Qfh is a fixed value indicative of a passband width narrower than that of the Q value (Qxl) used in the bass range. The gain to be supplied to the multiplier 73*b* of the filter part 73 is set to Gfh. Gfh is a fixed value indicative of a high gain.

RAM 13 is a rewritable memory, and has a work area (not shown in the figure) that temporarily stores various data when CPU 11 executes the control program 12*a*.

DSP 14 is an arithmetic unit for processing digital signals. DSP 14 filters (wave-filters) detected musical tone signals (input signals) input from the input terminal 31 according to the detected pitch, performs a level control according to the level of the filtered signal, and outputs the level-controlled tone signal to DAC 19.

In one embodiment, the foot pedal 15 is a pedal operator for turning on/off the effect to be added by the effect device 1. If the foot pedal 15 is in a normal state (non-operation state), the execution of the effect is turned off. When the operator operates (steps on) the foot pedal 15, the execution of the effect is turned on while the foot pedal 15 is being operated. The FBLC volume 16 is an operator for changing the value of the above-mentioned Gfm. Other operators 17 are operators other than the foot pedal 15 and the FBLC volume 16.

Figure 2:
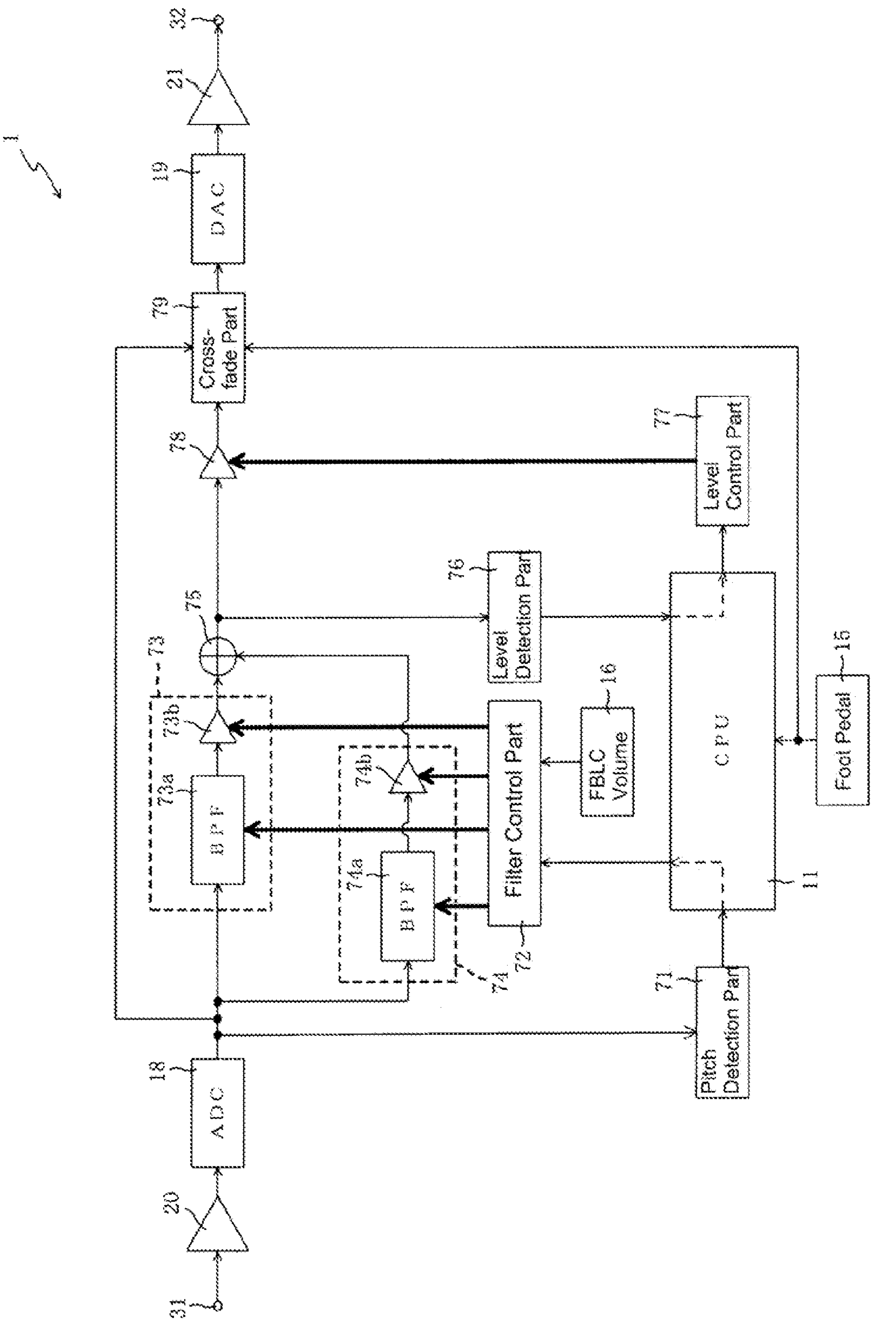
FIG. 2 is a functional block diagram showing the functions of the effect device.

FIG. 2 is a functional block diagram showing the functions of the effect device 1. Among the functions shown in FIG. 2, parts 71, 72, 76, 77 and 79 are functions that are realized by cooperative processing by CPU 11 and DSP 14. Each of the parts 73, 74, 75 and 78 is a function realized by the processing of DSP 14.

Musical tone signal input from the input terminal 31 is amplified by the amplifier 20, converted into a digital signal by ADC 18, and supplied to the pitch detecting part 71, the filter part 73 and/or the filter part 74, and a cross fade part 79.

The pitch detecting part 71 detects the pitch of the signal supplied from the ADC 18 (i.e., the pitch of the musical tone signal input from the input terminal 31), and supplies pitch information indicative of the detected pitch to the CPU 11. If the application of the effect is turned on by the operation of the foot pedal 15, CPU 11 supplies the pitch information to the filter control part 72.

The filter control part 72, based on the pitch information supplied from the pitch detection part 71 and the content of the filter control table 12*b*, sets parameters specifying filter characteristics to the filter part 73 and/or the filter part 74.

When the pitch information supplied from the pitch detection part 71 indicates the bass range, the filter control part 72 sets the center frequency (Fxl) and the Q value (Qxl) to BPF 74*a* of the filter part 74. Moreover, the filter control part 72 sets the gain (Qxl) to the multiplier 74*b*.

When the pitch information supplied from the pitch detection part 71 indicates the mid-range, the filter control part 72 sets the center frequency (Fxm) and the Q value (Qxm) to BPF 74*a* of the filter part 74. Also, the filter control part 72 sets the gain (Qxm) to the multiplier 74*b*. Further, the filter control part 72 sets the center frequency (Ffm) and the Q value (Qfm) to BPF 73*a* of the filter part 73. Moreover, the filter control part 72 sets the gain (Qfm) to the multiplier 73*b*. The value of Qfm changes according to the amount of operation of the FBLC volume 16.

When the pitch information supplied from the pitch detection part 71 indicates the treble range, the filter control part 72 sets the center frequency (Ffh) and the Q value (Qfh) to BPF 73*a* of the filter part 73. Moreover, the filter control part 72 sets the gain (Qfh) to the multiplier 73*b*.

The filter part 73 includes BPF 73*a* and the multiplier 73*b*. The filter part 74 includes BPF 74*a* and the multipliers 74*b*. In other words, the filter part 73 and the filter part 74 both function as band pass filters. The filter part 73 and the filter part 74 filter the signal (that is, the tone signal input from the input terminal 31) supplied from the ADC 18 using BPFs 73*a* and 74*a*, adjust the gain with the multipliers 73*b* and 74*b*, and supply the processed signal to an adder 75. The adder 75 adds the signals supplied from the filter part 73 and/or the filter part 74, and supplies the added signal to the level detection part 76 and the multiplier 78.

The level detection part 76 detects the level of the signal (that is, the signal in which the output signals of filter part 73 and/or the filter part 74 are added together) supplied from the adder 75, and supplies level information indicating the detected level to CPU 11. When the application of the effect is turned on by operating the foot pedal 15, CPU 11 supplies the level information to the level control part 77.

The level control part 77 sets a coefficient to the multiplier 78 based on the level information supplied from the level detection part 76. More specifically, when the level information supplied from the level detection part 76 indicates that the level of the signal supplied from the adder 75 is below a prescribed level, the level control part 77 sets a coefficient to raise the level to the multiplier 78.

On the other hand, when the level information supplied from the level detection part 76 indicates that the level of the signal supplied from adder 75 exceeds the prescribed level, the level control part 77 sets a coefficient to maintain the level to the multiplier 78. When the level of the signal supplied from the adder 75 is too large, a coefficient to lower the level may be set.

The multiplier 78 multiplies the signal supplied from adder 75 (that is, the signal in which the output signals of the filter part 73 and/or the filter part 74 are added together) with the coefficient set by the level control part 77 thereby adjusting the level, and supplies the processed signal to the cross-fade part 79.

The cross-fade part 79, according to the operational state of the foot pedal 15, outputs the tone signal input from the input terminal 31, or the signal supplied from the multiplier 78 (that is, the signal passed through the filter part 73 and/or the filter part 74) to the DAC 19. Also, when the operational state of the foot pedal 15 is switched, the cross-fade part 79 cross-fades the tone signal input from the input terminal 31 and the signal supplied from the multiplier 78, thereby performing switching of the signal to be output outside.

If the foot pedal 15 is operated (stepped on) from the normal state, the cross-fade part 79 decreases (fades out) the level of the tone signal input from the input terminal 31 along with the passage of time, and increases (fades in) the level of the signal with the passage of time, thereby switching the signal to be output outside. On the other hand, when the foot pedal 15 is returned from the operated state (stepped-on state) to the normal state, the cross-fade part 79 decreases (fades out) the level of the signal supplied from the multiplier 78 with the passage of time, and increases (fades in) the level of the tone signal input from the input terminal 31 with the passage of time, thereby switching the signal to be output outside.

The signal supplied from the cross-fade part 79 to DAC 19 is converted into an analog signal by DAC 19, amplified with the amplifier 21, and output outside (to the speaker 50 of the guitar amplifier) through the output terminal 32.

Next, with reference to FIGS. 3*a*, 3*b*, 4*a*, 4*b*, and. 5, an example of operations of the filter part (i.e., the filter parts 73 and 74) in the effect device 1 will be described.

Figure 3A:
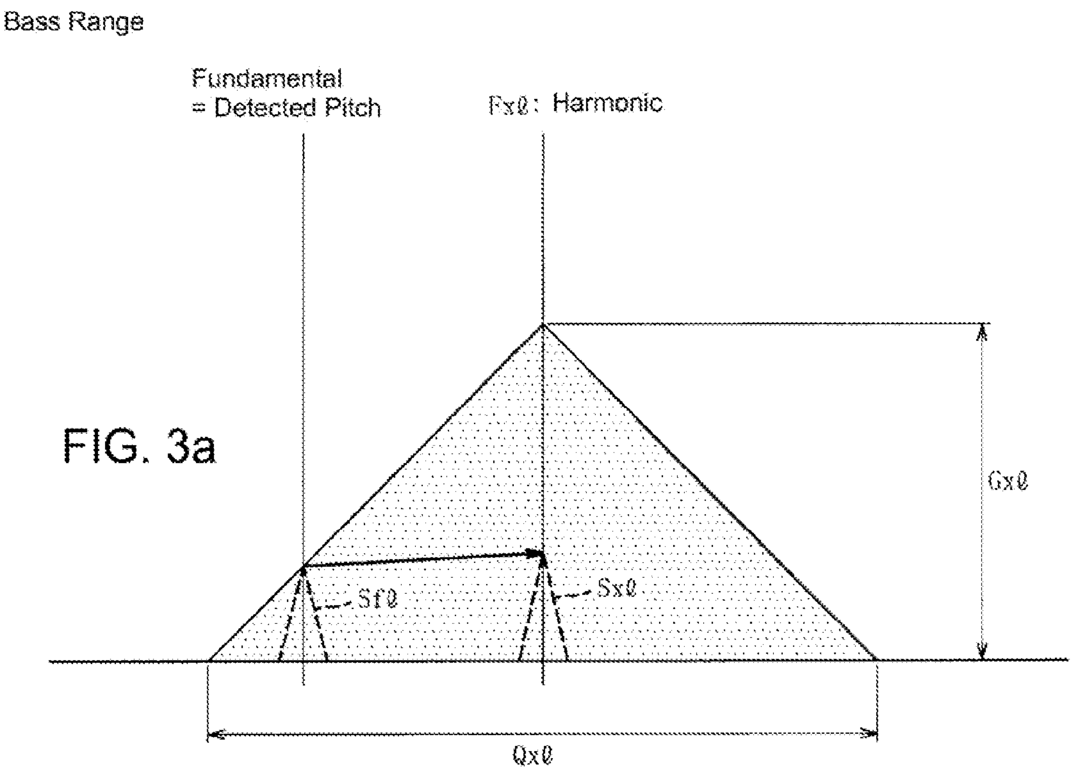
FIGS. 3*a* and 3*b* provide examples of operation of the filter part when the input signal is a musical tone in a bass range.
Figure 3B:
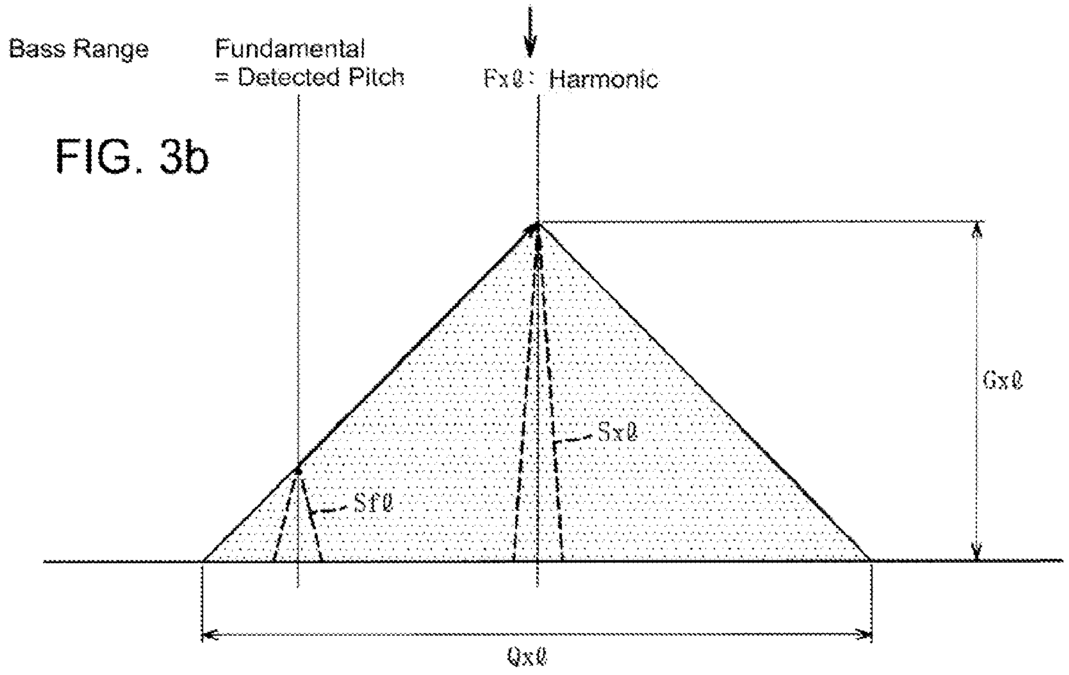

FIGS. 3*a* and 3*b* both show examples of the operation of the filter part when input signals are tones in the bass range. As described above, if the input signal is a musical tone in the bass range, one band-pass filter (the filter part 74) is used. Parameters based on the content of the filter control table 12*b* are set to the BPF 74*a* and the multiplier 74*b* of the filter part 74.

Specifically, the center frequency of BPF 74*a* is set to Fxl, which is the frequency of the predetermined harmonic for the fundamental, and the Q value of BPF 74*a* is set to the value (Qxl) indicative of a wide passband width including the frequency of the fundamental. In addition, the gain of the multiplier 74*b* is set to the value indicative of a high gain (Gxl).

When these parameters are set, the filter part 74 is set to have filter characteristics shown in a hatching area in FIGS. 3*a* and 3*b*. When the input signal (the tone signal input from the input terminal 31) is passed through the filter part 74 that has the filter characteristic shown in FIGS. 3*a* and 3*b*, a signal Sfl of the fundamental (the musical tone with the pitch detected by the pitch detection part 71; the keynote), and a signal Sxl that is a predetermined harmonic having a frequency equal to the center frequency of BPF 74*a* pass through the filter part 74.

The signal Sfl of the fundamental is output from the filter part 74 with its level being suppressed. On the other hand, the level of the signal Sxl of the predetermined harmonic increases gradually along with the loop of the fundamental. In other words, when the input signal is a tone in the bass range, the output signal from the filter part 74 (the signal Sfl of the fundamental, the signal Sxl of the predetermined harmonic) changes from the state shown in FIG. 3*a* to the state shown in FIG. 3*b*. As a result, the feedback sound shifts from the fundamental (the signal Sfl) finally to the predetermined harmonic (the signal Sxl) as shown by a thick arrow.

In the case of the bass range where the fundamental is strong and sufficient harmonic components are included, a filter characteristic having the frequency of a predetermined harmonic being set as the center frequency and a greater Q value (the filter characteristic shown in FIGS. 3*a* and 3*b*) may be set as the filter characteristic of the filter part 74, to pass the fundamental and the predetermined harmonic together, whereby natural feedback sound can be obtained.

Moreover, the harmonic to which the musical tone in the bass range shifts changes according to the acoustic space that comprises the feedback loop. Therefore, looseness in the harmonic shift can occur by passing the input signal in the bass range, including sufficient harmonic components, through the filter section 74 having the filter characteristic shown in FIGS. 3*a* and 3*b*. In this way, the resulting feedback sound will not comprise a "dirty" sound and the feedback performance of the performer is enhanced.

Figure 4A:
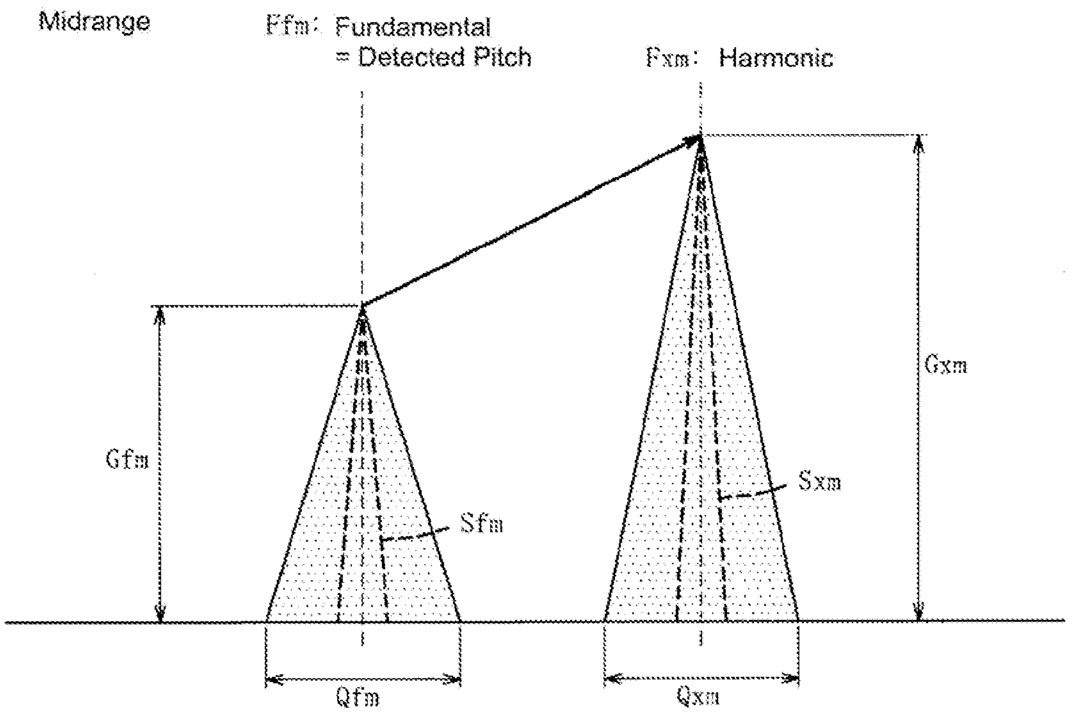
FIGS. 4*a* and 4*b* provide examples of operation of the filter part when the input signal is a musical tone in a mid-range.
Figure 4B:
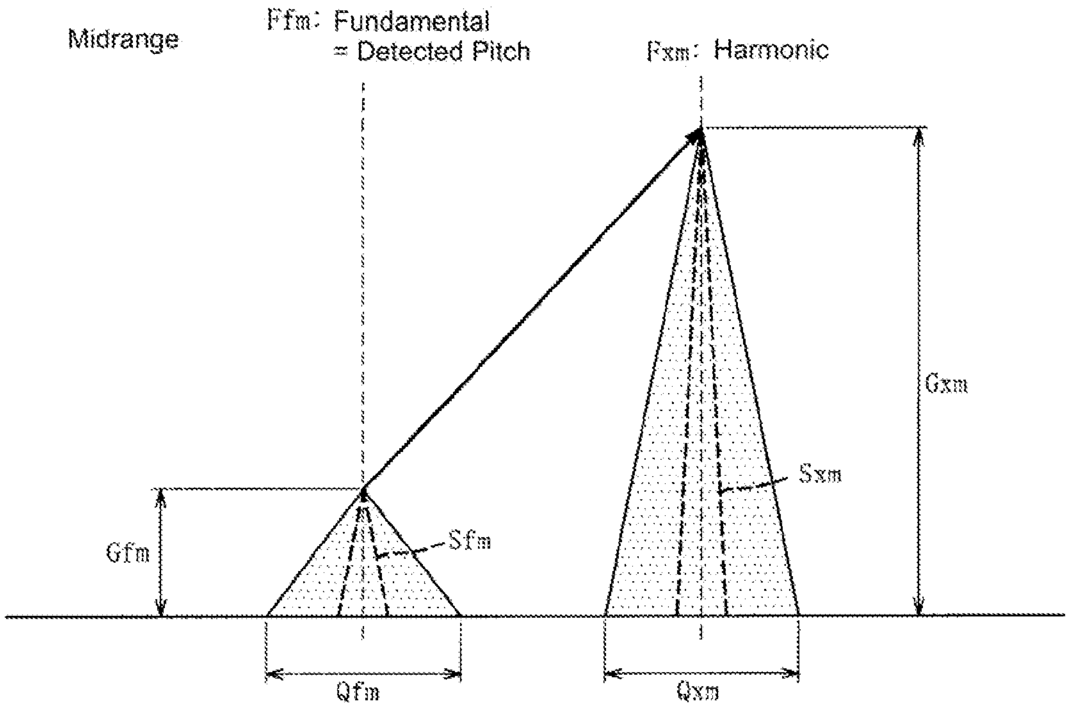

FIGS. 4*a* and 4*b* both show examples of the operation of the filter part when input signals are musical tones in the mid-range. As described above, when the input signal is a musical tone in the mid-range, two band-pass filters (the filter parts 73 and 74) are used. Parameters based on the content of the filter control table 12*b* are set to the BPF 73*a* and the multiplier 73*b* of the filter part 73.

For the filter part 73, the center frequency of BPF 73*a* is set to Ffm, which is the frequency of the fundamental (the pitch detected by pitch detection part 71), and the Q value of BPF 73*a* is set to a value (Qfm) indicative of a narrow passband width in which the signal Sfm of the fundamental is selectively passed. Also, the gain of the multiplier 73*b* is set to a value (Gfm) indicative of a low gain. The Gfm is a value that is smaller than the gain (Gxm) set to the multiplier 74*b* of the filter part 74.

The filter part 73 is set to have filter characteristics shown in a hatching area on the left-hand side of FIGS. 4*a* and 4*b*. When the input signal (the tone signal input from the input terminal 31) is passed through the filter part 73 that has the filter characteristic shown in FIGS. 4*a* and 4*b*, a signal Sfl of the fundamental (the musical tone with the pitch detected by the pitch detection part 71; harmonic) passes through the filter part 73.

For the filter part 74, the center frequency of BPF 74*a* is set to Fxm, which is the frequency of the predetermined harmonic for the fundamental, and the Q value of BPF 74*a* is set to a value (Qxm) indicative of a narrow passband width in which the signal Sxm of the predetermined harmonic can be selectively passed. Moreover, the gain of the multiplier 74*b* is set to a value (Gxm) indicative of a high gain.

The filter part 74 is set to have filter characteristics shown in a hatching area on the right-hand side of FIGS. 4*a* and 4*b*. When the input signal is passed through the filter part 74, which has the filter characteristic shown in FIGS. 4*a* and 4*b*, a signal Sxm of the predetermined harmonic having a frequency equal to the center frequency of BPF 74*a* passes through the filter 74.

Because the gain (Gfm) of the filter part 73 is set to a value smaller than the gain (Gxm) of the filter 74, a level difference is generated between the signal Sfm of the fundamental and the signal Sxm of the predetermined harmonic, and by the level difference, the harmonic transition of the feedback sound is induced. Therefore, by using the filter parts 73 and 74 with the filter characteristics set as shown in FIGS. 4*a* and 4*b*, and passing the input signal of the mid-range through the filter parts, feedback sound that finally shifts to harmonics can be obtained, such that natural feedback performance can be performed.

The gain (Gfm) of the filter part 73 can be arbitrarily changed by operating the FBLC volume 16. In other words, the level difference between the signal Sfm of the fundamental and the signal Sxm of a predetermined harmonic can be arbitrarily changed by operating the FBLC volume 16. The ease of the harmonic shift (the time to shift to a harmonic) changes somewhat according to the acoustic space that composes the feedback loop (for instance, the distance and the angle between the electric guitar 100 and the guitar amplifier (the speaker 50), the type of the electric guitar 100 and the guitar amplifier, etc.), but it depends on the level difference between the signal Sfm of the fundamental and the signal Sxm of the predetermined harmonic. Therefore, as the FBLC volume 16 is provided such that the level difference between the signal Sfm of the fundamental and the signal Sxm of a predetermined harmonic can be arbitrarily controlled, the ease of the harmonic shift can be controlled arbitrarily as desired by the performer.

In the example shown in FIG. 4*a* and the example shown in FIG. 4*b*, Gfm of the latter example is set to a smaller value compared with Gfm of the former example. In this case, in the example shown in FIG. 4*b* where the level difference between the signal Sfm of the fundamental and the signal Sxm of the predetermined harmonic is greater, the harmonic shift takes place more easily (the time to shift to the harmonic is faster). Also, by setting a higher value of Gfm, and creating a state in which not much level difference occurs between the signal Sfm of the fundamental and the signal Sxm of the predetermined harmonic, the feedback of the fundamental in the early stage can be maintained more easily.

Figure 5:
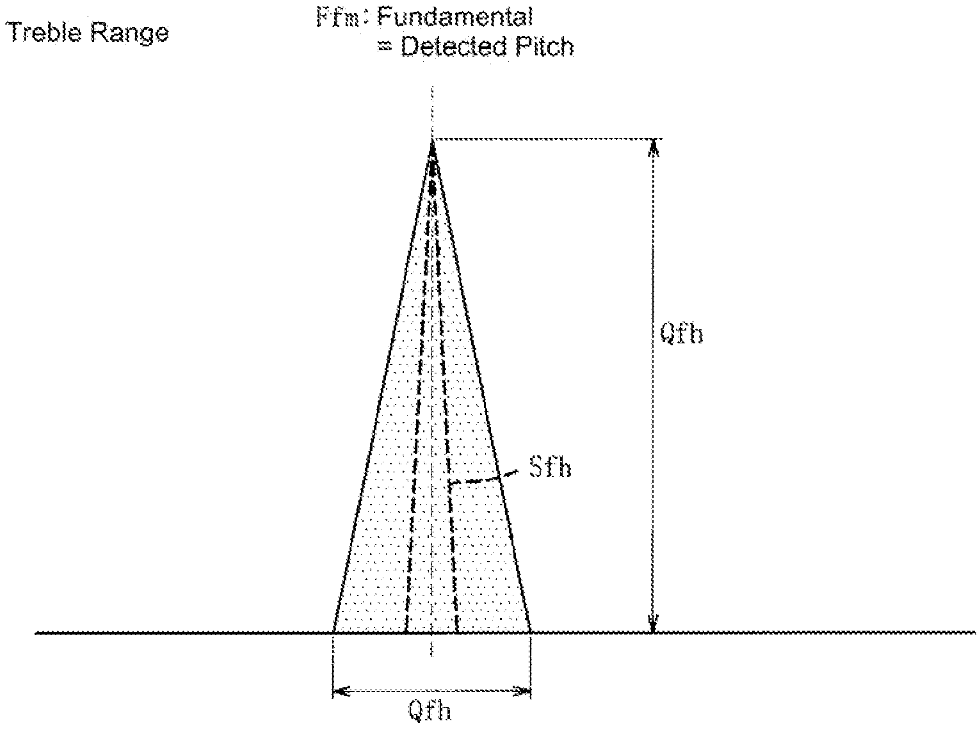
FIG. 5 shows an example of operation of the filter part when the input signal is a musical tone in a treble range.

FIG. 5 shows an example of the operation of the filter part when input signals are musical tones in the treble range. As described above, if the input signal is a musical tone in the treble range, one band-pass filter (the filter part 73) is used.

Parameters based on the content of the filter control table 12*b* are set to the BPF 73*a* and the multiplier 73*b* of the filter part 73.

Specifically, for the filter part 73, the center frequency of BPF 73*a* is set to Ffh, which is the frequency of the fundamental (the pitch detected by pitch detection part 71), and the Q value of BPF 73*a* is set to a value (Qfh) indicative of a narrow passband width in which the signal Sfh of the fundamental can be selectively passed. Also, the gain of the multiplier 73*b* is set to a value (Gfh) indicative of a high gain.

With these parameters set, the filter part 73 is provided with filter characteristics shown in a hatching area shown in FIG. 5. When the input signal (the tone signal input from the input terminal 31) is passed through the filter part 73 that has the filter characteristics shown in FIG. 5, a signal Sfh of the fundamental (the musical tone with the pitch detected by the pitch detection part 71; the keynote) passes through the filter part 73.

When the input signal in the treble range is input, only the fundamental is made to be passed through the filter part 73 that has the filter characteristics of FIG. 5. This prevents shifting to a super-high pitched sound and unpleasant feedback.

Referring to FIG. 6 and FIG. 7, the processing executed by CPU 11 of the effect device 1 having the above-described configuration will be described. First, FIG. 6 is a flow chart showing the main processing that CPU 11 executes. This main processing is started when the power supply is turned on to the effect device 1, and is repeatedly executed by CPU 11 while the power supply is turned on.

First, CPU 11 executes a pitch detection processing (S1). Specifically, in the pitch detection processing (S1), CPU 11 detects the pitch of the tone signal (input signal) input from the input terminal 31, and stores the detected pitch in a predetermined buffer provided in RAM 13.

Next, CPU 11 judges as to whether or not the foot pedal 15 is operated (i.e., as to whether the foot pedal 15 is stepped on) (S2). When the foot pedal 15 is manipulated, in other words, if the application of the effect is turned on (S2: Yes), CPU 11 determines as to whether an FB-in flag (not shown) provided in the RAM 13 is on (S3). Note that the FB-in flag (not shown) is a flag that indicates whether or not the feedback performance is being executed.

In S3, if the FB-in flag is off (S3: No), this indicates that the start of the feedback performance was indicated to the performer as a result of the foot pedal 15 having been operated. Therefore, in this case, CPU 11 sets on the FB-in flag (S4) and executes a processing that holds the latest pitch stored in the buffer in RAM 13 (S5). When the pitch hold processing in S5 is executed, CPU 11 does not update the pitch stored in the buffer until the hold is released. It may be configured not to detect the pitch until the hold is released.

After the processing in S5, CPU 11 executes a filter control processing that sets parameters to the filter parts 73 and 74 (DSP 14) (S6). The filter control processing (S6) is a processing that sets, to the filter parts 73 and 74 (DSP 14), parameters corresponding to the frequency band to which the detected pitch belongs, and details of the processing will be described later with reference to FIG. 7*a*.

Next, CPU 11 executes a cross-fade processing (S7). Specifically, in the cross-fade processing (S7), CPU 11 decreases the level of the input signal with the passage of time, and increases the level of the tone signal passed through the filter parts 73 and 74 (that is, the signal of the feedback sound) with the passage of time, thereby switching the signal to be output outside to a signal of the feedback sound.

After the processing in S7, CPU 11 executes a level control processing that controls the level of the signal to be output outside, according to the level of the signal output from the filter parts 73 and 74 (S8). Processing of the level control processing (S8) will be described later with respect to FIG. 7*b*.

Next, CPU 11 executes other processing (S9) and returns the processing to S2. Note that the other processing (S9) may include processing of reading the value of the FBLC volume 16, and storing the read value in a prescribed buffer provided in RAM 13. Also, the other processing (S9) may include reading the state or the value of other operators 17, and executing each processing according to the read content.

On the other hand, if the FB-in flag is on in S3 (S3: Yes), this indicates that the feedback performance is being executed. Therefore, in this case, CPU 11 shifts the processing to S8, and executes a level control processing.

Moreover, in S2, when the state foot pedal 15 is in the normal state, that is, the application of the effect is off (S2: No), CPU 11 judges as to whether the FB-in flag is on (not shown in the figure) (S10). If the FB-in flag is ON (S10: Yes), this indicates that the end of the feedback performance was indicated to the performer as a result of the state of the foot pedal 15 having returned from its operated state (the stepped-on state) to the non-operated state (that is, the normal state). Therefore, CPU 11 sets the FB-in flag off in this case (S11).

Next, CPU 11 executes an FB stop processing (S12). Specifically, in the FB stop processing (S12), CPU 11 executes a cross-fade processing to switch the signal to be output outside from the tone signal passed through the filter parts 73 and 74 (that is, the signal of the feedback sound) to the input signal, and executes a processing that stops the level control by the level control processing (S8).

After the processing in S12, CPU 11 executes a pitch detection processing (S13) and shifts the processing to S9. In the pitch detection processing in S13, CPU 11 detects the pitch of the input signal, and updates the value stored in the buffer used in the pitch detection processing in S1 with the detected pitch.

On the other hand, in S10, if the FB-in flag is off (S10: No), it indicates that the feedback performance is not executed. In this case, CPU 11 shifts the processing to S13, and executes a pitch detection processing.

FIG. 7*a* is a flow chart that shows the filter control processing (S6) described above. First, CPU 11 judges to which frequency band region the pitch of the input signal detected by the pitch detection processing (S1 or S13) stored in the buffer in RAM13 belongs (S21).

When the pitch detected is in the bass range (S21: Bass Range), CPU 11 sets parameters for the bass range (Fxl, Qxl, Gxl) to the filter part 74, by referring to the filter control table 12*b* (S22), and then ends this processing. By the processing in S22, the filter characteristic of the filter part 74 is set to be the one shown in FIG. 3.

On the other hand, when the pitch detected is in the mid-range (S21: mid-range), CPU 11 sets parameters for the mid-range (Ffm, Qfm, Gfm, Fxm, Qxm, Gxm) to the filter part 73 and the filter part 74 by referring to the filter control table 12*b* (S23), and then ends this processing. By the processing in S23, the filter characteristics of the filter parts 73 and 74 are set to the parameters shown in FIG. 4*a* and FIG. 4*b*.

Moreover, when the pitch detected belongs to the treble range (S21: treble range), CPU 11 sets parameters for the treble range (Ffh, Qfh, Gfh) to the filter part 73 by referring to the filter control table 12*b* (S24) and then ends this processing. By the processing in S24, the filter characteristic of the filter part 73 is set to be the parameters shown in FIG. 5.

FIG. 7*b* is a flow chart that shows the level control processing (S8) described above. First, CPU 11 executes a processing that detects the level of the signal that has passed the filter part 73 and/or the filter part 74 (S41). Specifically, in S41, CPU 11 detects the level of the signal added by the adder 75.

Next, CPU 11 determines whether or not the detected level is less than a prescribed level (S42). In S42, when the detected level is less than the predetermined level (S42: Yes), a coefficient to raise the level of the signal is set to the multiplier 78 (S43), and then this processing is ended. By the processing in S43, after passing the adder 75, the level of the signal that was less than the predetermined level becomes higher by the multiplier 78.

On the other hand, in S42, when the detected level exceeds the predetermined level (S42: No), a coefficient to maintain the level of the signal is set to the multiplier 78 (S44), and then this processing is ended. Even after having passed through the multiplier 78, the level of the signal that passed the adder 75 is maintained by the processing S44. When the level of the signal supplied from the adder 75 becomes too large, a coefficient to lower the level may be set to the multiplier 78 in S44. In this way, the level of the signal that passed the adder 75 becomes reduced by the multiplier 78.

According to the effect device 1 of the described embodiments, the pitch of the tone signal (input signal) based on vibration of the strings of the electric guitar 100 is detected, characteristics of the band-pass filter (filter parts 73 and 74) are set according to the detected pitch, and the input signal is passed through the band-pass filter whose filter characteristic is set in a manner as described above. As a result, the band-pass filter outputs the signal with the frequency characteristic corresponding to the pitch of the input signal. If the filter characteristic of the band-pass filter is set so that the signal output from the band-pass filter has a frequency characteristic suitable for the feedback performance, the signal of the frequency characteristic suitable for the feedback performance can be output to an outside acoustic space through the guitar amplifier (speaker 50). As a result, the vibration of the strings of the electric guitar 100 can be maintained by the tone emanated from the guitar amplifier, such that a feedback performance with a high degree of difficulty can be easily achieved.

Further, upon detecting the level of the output signal of the filter part 73 and/or the filter part 74, if the level is smaller than a prescribed level, the signal level (that is, the level of the output signal of the filter part 73 and/or the filter part 74) is raised. As a result, attenuation of the level of the signal output from the guitar amplifier to the outside acoustic space is suppressed, and sustain can be obtained, such that vibration of the strings of the electric guitar 100 is stably maintained. Accordingly, the feedback performance can be realized more easily. Further, because only the level of the signal with a specific frequency characteristic that passed the band-pass filter (filter part 73, 74) is controlled, the level of the signal with frequency characteristics that becomes the source of unpleasant sound (so-called, howling) can be prevented from rising. As a result, the feedback performance can be carried out, while preventing unpleasant sounds from being generated.

Moreover, because the level of the signal with a specific frequency characteristic that passed the band-pass filter (filter part 73, 74) can be maintained at a certain level, the feedback performance becomes possible, even if the volume or the amount of gain is at a level where the feedback performance cannot usually be done. Therefore, the limitation imposed on the environment where the feedback performance is carried out, for example, the necessity to use a large-scale guitar amplifier, and the like can be excluded. As a result, the feedback performance can be achieved with a small guitar amplifier.

Moreover, according to the effect device 1 of the embodiment, for each frequency band to which the pitch of the input signal (the detected pitch) belongs, a suitable filter characteristic for the frequency band is set. Therefore, the filter characteristic of the band-pass filter can be set for each frequency band (bass range, mid-range, and treble range) so that the signal with a frequency characteristic suitable for the feedback performance is output, such as, for example, the feedback sound can be shifted easily from the fundamental (keynote) to harmonics, and the like. Therefore, a suitable feedback performance can be achieved for each frequency band.

Although the invention has been described with respect to certain embodiments, the invention is not limited to the embodiments described above, and it can be readily presumed that various changes and improvements can be made in the range that does not deviate from the subject matter of the invention.

For instance, the embodiment described above is configured in a manner that the level of the output signal of the filter part 73 and/or the filter part 74 is detected by the level detection part 76, and the level of the output signal from the multiplier 78 (that is, the level of the output signal from the output terminal 32) is controlled according to the detected level. However, the signal whose level is to be detected by the level detection part 76 may be a signal before being input to the filter part (filter part 73, 74).

Figure 8:
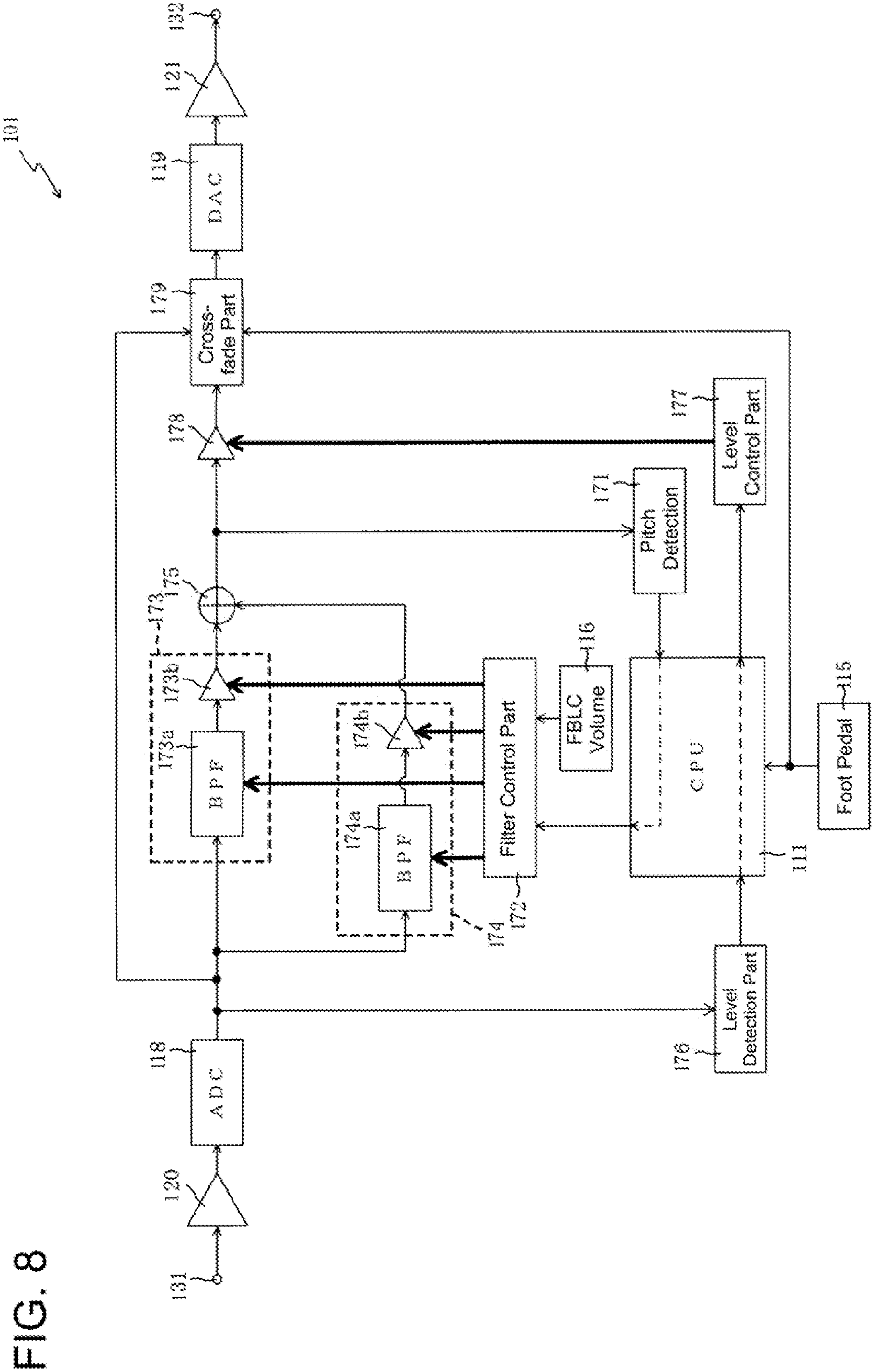
FIG. 8 is a functional block diagram showing functions of the effect device of a modified example.

FIG. 8 is a functional block diagram showing the function of an effect device 101 in accordance with a modified example. This modified example of FIG. 8 has the same named elements as shown in FIG. 2 as the embodiment described above. In the effect device 101 of this modified example as shown in FIG. 8, an input signal converted into a digital signal by ADC 118 is input to the level detection part 176. The level detection part 176 detects the level of the signal input from ADC 118, and supplies level information indicative of the detected level to CPU 111. When the application of the effect is turned on by operating the foot pedal 115, CPU 111 supplies the level information to the level control part 177.

In the modified example shown in FIG. 8, the level of the output signal from the multiplier 178 is controlled according to the level of the signal before being input to the filter parts 173 and 174. In this modified example, because the level of the signal with a specific frequency characteristic that passed the band-pass filter (filter parts 173 and 174) is controlled, an effect similar to the effect realized in the above-described embodiment can be obtained.

Moreover, the pitch of the signal (tone signal) output from the adder 175 is detected by the pitch detection part 171, and parameters corresponding to the detected pitch are set to the filters 173 and 174 in the modified example shown in FIG. 8. In the embodiment described above with respect to FIG. 2, the pitch detection by the pitch detection part 71 is done on the input signal to the filters 73 and 74. However, in this modified example of FIG. 8, the pitch detection by the pitch detection part 171 may be performed on the output signal from the filters 173 and 174. In accordance with the modified example, because the signal with a frequency characteristic corresponding to the pitch of the tone (feedback sound) input from the input terminal 131 can be output through the filter parts 173 and 174, the effect similar to the above-described embodiment can be obtained. In that case, it is preferable that the filters 173 and 174 may be set to a flat characteristic (the setting may be reset).

Moreover, in the embodiment described above with respect to FIG. 2, the level of the output signal from the adder 75 is detected by the level detection part 76. However, two level detection parts, a first level detection part where the level of the output signal from the band-pass filter (filter parts 73 and 74) is detected (the level detection part of the above-described embodiment of FIG. 2), and a second level detection part 176 where the level of the input signal to the band-pass filter is detected (the level detection part of the above-described modified example of FIG. 8), may be provided. In this case, the first level detection part and the second level detection part may be selectively used. For instance, the level may be detected by the first level detection part for a while after the feedback performance begins, and thereafter the level may be detected by the second level detection part. Alternatively, the level difference between the first level detection part and the second level detection part may be used for the level control.

Also, in the above-described embodiment of FIG. 2, the level of the added signal of the output signals from the filter parts 73 and 74 added by the adder 75 is detected by the level detection part 76. Instead of this configuration, the level of each of the signals output from the filter parts 73 and 74 may be detected, respectively, and the larger of the levels and a predetermined level may be compared.

Moreover, in the above-described embodiment of FIG. 2, the pitch detection by the pitch detection part 71 is done to the input signal to the filter parts 73 and 74. However, two pitch detection parts, a first pitch detection part where the pitch of the input signal to the filter parts 73 and 74 is detected (the pitch detection part of the above-described embodiment of FIG. 2), and a second pitch detection part where the pitch of the output signal from the filter parts 173 and 174 is detected (the pitch detection part of the above-described modified example of FIG. 8), may be provided. In this case, the first pitch detection part and the second pitch detection part may be suitably selected and used.

Moreover, in the above-described embodiment, two band-pass filters (the filter parts 73 and 74) are installed. However, the number of band-pass filters may be one. When one band-pass filter is provided, a control for performing sweep from the fundamental to the harmonic may be conducted. Moreover, it may be possible to have embodiments in which three band-pass filters or more are installed.

Also, in the above-described embodiment, filter parts 73, 74 including BPFs 73*a*, 74*a* are used. However, BPFs 73*a* and 74*a* may be replaced with a high-pass filter and a low-pass filter serially connected to each other.

Also, in the above-described embodiment, the input signal is filtered by the band-pass filter (the filter parts 73 and 74). However, a variety of other filters may be used, as long as the filter can pass only a specified band.

Moreover, in the above-described embodiment, the filter characteristic of the band-pass filter (the filter parts 73 and 74) is changed independently for each of the three divided frequency bands, i.e., the bass range, the mid-range, and the treble range. However, each of the band regions may be further divided, and the filter characteristic of the band-pass filter may be changed independently for each of the further divided bands.

Moreover, in the above-described embodiment, the level of the output signal from the multiplier 78 (that is, the level of the output signal from the filter part 73, 74) is controlled by the level control part 77 according to the level detected by the level detection part 76. In alternative embodiment, the level of the input signal to the filter parts 73 and 74 may be controlled by the level control part according to the level detected by the level detection part 76. Moreover, the level control part 77 may add parameters to the multipliers 73*b* and 74*b* of the filter part, to control the level of the feedback sound.

Moreover, in the above-described embodiment, the level difference between the signal Sfm of the fundamental and the signal Sxm of the harmonic is changed by changing the value of Gfm in proportion to the amount of operation of the FBLC volume 16. In place of such a configuration, the value of Gfm may be set as a fixed value, and the value of Gxm may be changed in proportion to the amount of operation of the FBLC volume 16. Or, the value of Gfm and the value of Gxm may be mutually (relatively) changed in proportion to the amount of operation of the FBLC volume 16, thereby changing the level difference.

Moreover, in the above-described embodiment, in the other processing (S9), the processing to store the value of the FBLC volume 16 read in a prescribed buffer provided in RAM 13 is executed. However, the value of the FBLC volume 16 read may be converted into a value of Gfm based on a prescribed table, and the value may be stored in the buffer.

Also, in the above-described embodiment, the electric guitar 100 is exemplified as a stringed instrument that is connected with the effect device 1 to perform the feedback performance. However, other stringed instruments, such as, an electric base may be used.

In the above-described embodiment, the effect device 1 is illustrated as being provided independently from the guitar amplifier (the speaker 50). However, the effect device 1 may be provided in a form built into the guitar amplifier or other amplifiers. Alternatively, the effect device 1 may be in a form built into the electric guitar 100 (a stringed instrument).

What is claimed is:

1. An effect device comprising:

an input device to which a tone signal based on vibration of strings of a stringed instrument is input;

a first filter device comprising a band pass filter that passes the tone signal input from the input device;

a pitch detection device that detects a pitch of the tone signal input from the first filter device and/or a pitch of the tone signal to be input to the first filter device;

a filter control table providing parameters for the filter device for different frequency bands;

a setting device that sets the first filter device with the parameters in the filter control table for the frequency band to which the detected pitch belongs, wherein the set parameters cause the first filter device to produce the tone signal for the frequency band to which the detected pitch belongs with frequency characteristics suitable for feedback performance, wherein the parameter set by the setting device includes a center frequency, a Q value comprising a passband width, and a gain of the filter device, wherein when the pitch detected by the pitch detection device belongs to a frequency band of a predetermined mid-range, the setting device sets, at the first filter device, the center frequency to a frequency of a harmonic based on the pitch detected by the pitch detection device and the gain to a predetermined value, and sets, at a second filter device, the center frequency to a pitch detected by the pitch detection device, and the gain to a value smaller than the predetermined value;

an output device that outputs the tone signal output from the first and second filter devices outside;

a level detection device that detects a level of the tone signal output from the first and second filter devices and/or a level of the tone signal to be input in the first filter device; and a level control device that controls the level of the tone signal output outside from the output device to have a level corresponding to the level detected by the level detection device.

2. The effect device of claim 1, wherein the setting device sets, according to a frequency band to which the pitch detected by the pitch detection device belongs, a different parameter to each of the first and second filter devices according to the frequency band.

3. The effect device of claim 1, wherein the level control device raises the level of the tone signal output from the first and second filter devices when the level detected by the level detection device is below a predetermined level, and maintains the level of the tone signal output from the first and second filter devices when the level exceeds the predetermined level.

4. The effect device of claim 1, wherein, when the pitch detected by the pitch detection device belongs to a frequency band of a predetermined bass range, and wherein the setting device sets, at one of the filter devices, the center frequency to a frequency of a harmonic based on the pitch detected by the pitch detection device and the Q value to a size that can selectively pass a musical tone based on the pitch detected and the harmonic.

5. The effect device of claim 1, wherein the setting device is capable of arbitrarily changing a relative difference between a gain set at the first filter device and a gain set at the second filter device.

6. The effect device of claim 1, wherein, when the pitch detected by the pitch detection device belongs to a frequency band of a predetermined treble range, and wherein the setting device sets, at the first filter device, the center frequency to a pitch detected by the pitch detection device and the Q value to a size that can selectively pass a musical tone based on the pitch detected.

7. An effect device in communication with a stringed instrument and a speaker, comprising:

a central processing unit (CPU);

a digital signal processor (DSP) implementing a plurality of filters;

a filter control table providing parameters for the filters for different frequency bands, wherein the filter control table indicates for each of the frequency bands at least one of the filters to use to filter the input tone signal, and for each of the filters, the parameters specifying the filter characteristics, and wherein multiple of the filters are indicated to use for one of the frequency bands;

wherein at least one of the CPU and the DSP perform operations comprising:

receiving an input tone signal based on vibrations of the stringed instrument;

determining a pitch;

determining, from the pitch, a frequency band of the detected pitch;

setting parameters in the filters with filter characteristics in the filter control table for the frequency band to which the detected pitch belongs to provide frequency characteristics suitable for feedback performance; and passing the input tone signal into the filters set with the determined parameters to produce a filter output signal that is used to generate an output signal for feedback performance produced through the speaker.

8. The effect device of claim 7, wherein the filter output signal from the filters has frequency characteristics corresponding to the determined pitch.

9. The effect device of claim 7, wherein each of the filters includes a band pass filter and a multiplier, and wherein the parameters specifying the filter characteristics include a center frequency and a passband width for the band pass filter of the filter and a gain for the multiplier to use to adjust the output of the band pass filter to produce the filter output signal.

10. The effect device of claim 7, wherein the DSP further includes an adder, wherein the adder adds each of the filter output signals received from the filters when multiple filters are indicated for the frequency band including the determined pitch.

11. The effect device of claim 7, wherein the DSP includes a multiplier, wherein the operations further comprise:

detecting a level of the filter output signal; and setting a coefficient for the multiplier based on the detected level, wherein the multiplier multiplies the filter output signal by the coefficient.

12. The effect device of claim 11, wherein the setting the coefficient comprises:

determining whether the detected level is below a prescribed level; and setting the coefficient to raise the level to the multiplier in response to determining that the detected level is below the prescribed level.

13. The effect device of claim 11, wherein the operations further comprise:

detecting an operation of a user control mechanism with respect to an operated state and a normal state;

decreasing a level of the input tone signal over time and increasing a level of the filter output signal over time in the generated output signal in response to detecting that the user control mechanism has changed from the normal state to the operated state; and increasing the level of the input tone signal over time and decreasing the level of the filter output signal over time in the generated output signal in response to detecting that the user control mechanism has changed from the operated state to the normal state.

14. The effect device of claim 7, wherein the pitch is determined from the input signal.

15. The effect device of claim 7, wherein the received input tone signal comprises a second input tone signal received after a first input tone signal, wherein the pitch is determined from the filter output signal produced by the filters processing the first input tone signal.

16. The effect device of claim 7, wherein at least one of the filters is a band-pass filter, wherein the parameter set in the at least one of the filters includes a center frequency, a Q value comprising a passband width, and a gain of the filter, wherein when the pitch detected belongs to a frequency band of a predetermined bass range, the at least one of the filters is set at the center frequency to a frequency of a harmonic based on the detected pitch and the Q value to a size that can selectively pass a musical tone based on the detected pitch and the harmonic.

17. A method, comprising:

providing a filter control table providing parameters for a plurality of filters for different frequency bands, wherein the filter control table indicates for each of the frequency bands at least one of the filters to use to filter the input tone signal, and for each of the indicated filters, the parameters specifying the filter characteristics, and wherein multiple filters are indicated to use for one of the frequency bands;

receiving an input tone signal based on vibrations of a stringed instrument;

determining a pitch;

determining, from the pitch, a frequency band of the detected pitch;

setting parameters in the filters with filter characteristics in the filter control table for the frequency band to which the detected pitch belongs to provide frequency characteristics suitable for feedback performance;

passing the input tone signal into the filters set with the determined parameters to produce a filter output signal that is used to generate an output signal for feedback performance produced through a speaker.

18. The method of claim 17, wherein the filter output signal from the filters has frequency characteristics corresponding to the determined pitch.

19. The method of claim 17, wherein each of the filters includes a band pass filter and a multiplier, and wherein the parameters specifying the filter characteristics include a center frequency and a passband width for the band pass filter of the filter and a gain for the multiplier to use to adjust the output of the band pass filter to produce the filter output signal.

20. The method of claim 17, further comprising:

adding each of the filter output signals received from the filters when multiple filters are indicated for the frequency band including the determined pitch.

21. The method of claim 17, further comprising:

detecting a level of the filter output signal;

setting a coefficient based on the detected level; and multiplying the filter output signal by the coefficient.

22. The method of claim 21, wherein the setting the coefficient comprises:

determining whether the detected level is below a prescribed level; and setting the coefficient to raise the level to the multiplier in response to determining that the detected level is below the prescribed level.

23. The method of claim 21, further comprising:

detecting an operation of a user control mechanism with respect to an operated state and a normal state;

decreasing a level of the input tone signal over time and increasing a level of the filter output signal over time in the generated output signal in response to detecting that the user control mechanism has changed from the normal state to the operated state; and increasing the level of the input tone signal over time and decreasing the level of the filter output signal over time in the generated output signal in response to detecting that the user control mechanism has changed from the operated state to the normal state.

24. The method of claim 17, wherein the pitch is determined from the input signal.

25. The method of claim 17, wherein the received input tone signal comprises a second input tone signal received after a first input tone signal, wherein the pitch is determined from the filter output signal produced by the filters processing the first input tone signal.

26. The method of claim 17, wherein at least one of the filters is a band-pass filter, wherein the parameter set in the at least one filter includes a center frequency, a Q value comprising a passband width, and a gain of the filter device, wherein when the pitch detected belongs to a frequency band of a predetermined bass range, the at least one of the filters is set at the center frequency to a frequency of a harmonic based on the detected pitch and the Q value to a size that can selectively pass a musical tone based on the detected pitch and the harmonic.

* * * * *